April 12, 1955   F. K. H. NALLINGER   2,706,085
THERMOSTATIC REGULATING DEVICE FOR THE LIQUID
COOLING SYSTEM OF A COMBUSTION ENGINE
Filed March 29, 1951
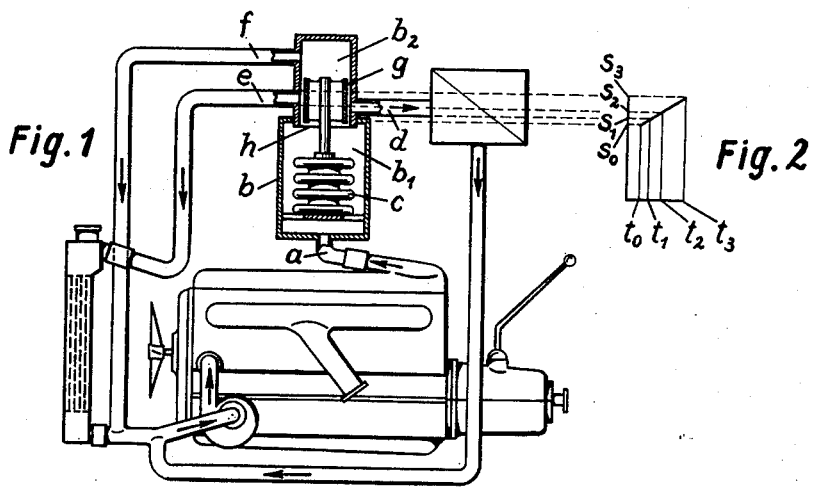
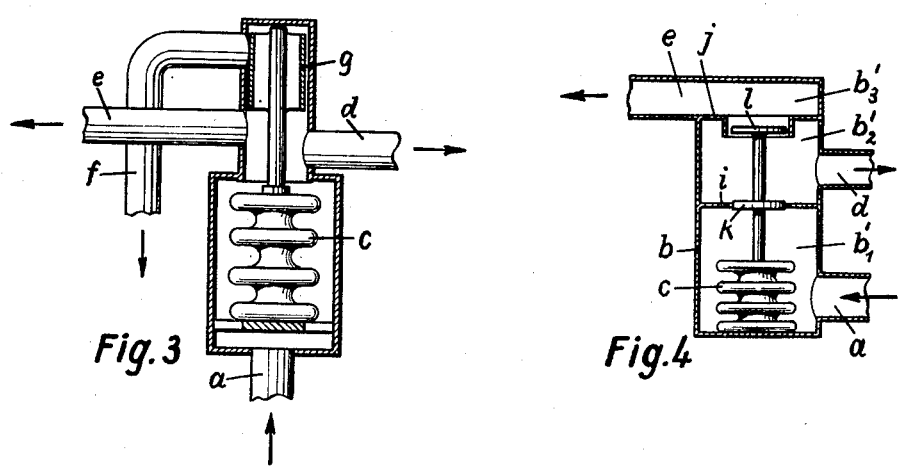
INVENTOR.
FRIEDRICH K.H. NALLINGER.
BY Dicke and Padlon
ATTORNEYS.

United States Patent Office 2,706,085
Patented Apr. 12, 1955

2,706,085

THERMOSTATIC REGULATING DEVICE FOR THE LIQUID COOLING SYSTEM OF A COMBUSTION ENGINE

Friedrich K. H. Nallinger, Stuttgart, Germany, assignor to Daimler-Benz Aktiengesellschaft, Stuttgart-Unterturkheim, Germany Application March 29, 1951, Serial No. 218,131

4 Claims. (Cl. 237—8)

The present invention relates to a thermostatic device for regulating the liquid cooling system of a combustion engine, particularly for driving a vehicle, and a heating device operated by the cooling liquid.

It is an object of the present invention to keep the engine free from undesirable reactions caused by the heating device, and to thereby ensure an undisturbed operation of the engine.

A further object of the present invention is to improve the heating effectiveness of the vehicle heater as well as the efficiency of the engine.

The heat exchangers for heating a vehicle are, as a rule, directly connected to the cooling jacket of the engine so that the cooling liquid which absorbs the waste heat of the engine may flow at all times through such heater. This has the disadvantage that when a cold engine is started, a part of the heat produced by it is immediately absorbed by the heater so that the engine is able to warm up only very slowly, and when the engine is only slightly warmed up, such loss of heat will cool it off rapidly. Especially under unfavorable operating conditions, for example on long down-hill drives, such cooling may be so severe that the heat developed by the engine will not be sufficient for a proper operation thereof, even though the thermostat may be closed and the radiator disconnected.

In contrast thereto it is an essential characteristic of the present invention that when the engine is cold, the heating device is cut off from the cooling cycle of the engine and is only connected thereto at a certain increased temperature.

This ensures that, even when the engine is started from absolutely cold, it will warm up quickly since no heat is dissipated in the heating device, and that on long down-hill drives the engine will be maintained at a temperature sufficiently high for continued, proper operation.

Another feature of the present invention is that as the engine warms up the cooling liquid beyond a certain temperature, it is first utilized for purposes of heating the vehicle and only thereafter passed on to the radiator after further increase in the temperature of the cooling liquid. Excessive waste heat of the engine may thus pass off to the radiator only after the energy required for heating the vehicle has been branched off therefrom. This not only improves the thermal efficiency of the engine but also produces adequate heating even when the engine runs at low speed and is relatively cool.

The accompanying drawing diagrammatically illustrates two embodiments of the present invention, in which Figure 1 shows, partly in cross section, the novel arrangement of a thermostatic control valve in the position when the engine is cold, and including a slide valve for controlling a heating conduit, radiator conduit, and short-circuit conduit;

Figure 2 is a temperature stroke diagram for the embodiment shown in Figure 1;

Figure 3 shows the thermostatic valve in the position when the engine is well heated up; and Figure 4 shows a modification of the thermostatic control valve according to the invention.

In the drawings, the conduit $a$ comes from the engine jacket and carries the cooling water to the thermostat casing $b$ which houses the thermostat $c$. The conduit $d$ leads to the heat exchanger or heater, from where the cooling water may be led back to the engine in a conventional manner. The main conduit $e$ leads to the radiator of the engine, and a short-circuit conduit or by-pass $f$ leads back directly to the engine, by-passing the radiator, or joins the return pipe which connects the radiator with the engine and may, for example, contain a water pump.

In Figure 1, the thermostat $c$ controls the conduits $d$, $e$, and $f$ by means of a tubular slide valve $g$. The position of the slide valve $g$, as shown in Figure 1, is the one which prevails when the engine as well as the cooling water are in a cold condition corresponding to temperature $t_0$ of Figure 2. The slide valve $g$ then assumes its lowest position which may be determined, for example, by a stop $h$ and corresponds to the stroke position $s_0$ of the lower edge of the slide valve as shown in Figure 2. The conduits $d$ and $e$ are closed at that time by the slide valve $g$. However, since the tubular slide valve $g$ is hollow and open at both ends, the cooling liquid may pass from the space $b_1$ of the casing $b$ into the narrower space $b_2$ and from there into the short-circuit conduit $f$.

If the temperature of the cooling liquid rises above the temperature $t_0$ (Figure 2) as a result of a warming up of the engine, the thermostat $c$ begins to lift the slide valve $g$ above the position $s_0$ without, however, at first opening the heating conduit $d$. Consequently, until the engine has warmed up sufficiently for proper operation, no heat is passed off to the vehicle heater. When the temperature $t_1$ is reached, the lower edge of the slide valve $g$ takes the position $s_1$. At this moment, the slide valve begins to open the heating conduit $d$, while the main conduit $e$ to the radiator still remains closed. Consequently, the cooling water flows into the heating conduit $d$, and thus may there deliver the heat for heating the interior of the vehicle or for other purposes. Thus, the heat exchanger or heater acts as a "recooler" for the cooling liquid since thermal energy acquired by the cooling liquid in the engine jacket is removed therefrom by the reverse heat transfer process from that in the cooling jacket which takes place in the heater or heat exchanger where thermal energy is released or given off by the cooling liquid.

If the engine warms up further to a temperature $t_2$, the lower edge of the slide valve $g$ reaches the position $s_2$ where it also begins to open the radiator conduit $e$, while simultaneously therewith the upper edge of the slide valve $g$ begins to close the short-circuit conduit $f$. The heating conduit $d$ remains open during this time, so that the vehicle heater continues to operate. In the extreme position $s_3$ at a temperature $t_3$ the conduit $e$ is completely open, whereas the short-circuit conduit $f$ is fully closed. This position is clearly shown in Figure 3.

In the modified construction in accordance with Figure 4, no special short-circuit conduit or by-pass is shown, although it may be provided in a similar manner as shown in Figures 1 and 3. The casing $b$ shown in Figure 4 is subdivided into three chambers $b_1'$, $b_2'$, and $b_3'$, the chamber $b_1'$ which contains the thermostat $c$ being connected to the conduit $a$, while the heating conduit $d$ is connected to the chamber $b_2'$ and the radiator conduit $e$ to the chamber $b_3'$. The chambers are separated from each other by partitions $i$ and $j$ which are provided with central openings which are controlled by valves $k$ and $l$. If the temperature rises, only the valve $k$ at first releases the opening in the partition $i$ separating the chambers $b_1'$ and $b_2'$, so that the cooling water, which comes from the engine through the conduit $a$, may flow to the heater conduit $d$. Only when there is a further increase in the temperature of the cooling water, the valve $l$ also releases the opening in the partition $j$ so that the cooling water may also flow through the conduit $e$ to the radiator.

If desirable, the valve of whatever type or construction may also be designed so that, when the engine is cold, it will also close the short-circuit conduit or by-pass $f$ either partly or entirely, thus allowing only a weak circulation of cooling water or perventing it entirely, and thereby permitting the engine to warm up more quickly. In such a case, the valve may either close the short-circuit conduit when opening the heater conduit or, preferably, before opening it.

The embodiment of the invention shown in Figures 1 to 3 is primarily designed for a cooling system with a circulating pump, while the embodiment shown in Figure 4 is designed primarily for one without such a pump.

The invention is not restricted to the particular embodiments as shown and described herein, but may be modified considerably without departing from the scope thereof.

What I claim is:

1. In a cooling system for an internal combustion engine driven vehicle having liquid cooling medium therein, a vehicle heater and a radiator operatively connected with said engine for passage of the cooling medium therethrough, thermostatic means connected to said engine and exposed to the cooling medium, and means controlled by said thermostatic means for initially gradually increasing the flow of cooling medium to said heater and thereafter also gradually increasing the flow of cooling medium to said radiator as well as to said heater.

2. In a cooling system for an internal combustion engine driven vehicle having a liquid cooling medium therein, a vehicle heater and a radiator operatively connected with said engine for passage of the cooling medium therethrough, thermostatic means connected to said engine and exposed to the cooling medium, and means controlled by said thermostatic means for preventing any flow of cooling medium to said heater and radiator with said medium at relatively lower temperatures and for initially gradually increasing said flow to said heater and thereafter also gradually increasing said flow to said radiator as the temperature of the cooling medium gradually increases.

3. In a cooling system for an internal combustion engine driven vehicle having a liquid cooling medium therein, a vehicle heater, a radiator, thermostatic means connected to said engine for passage of the cooling medium therethrough, a by-pass means for conducting the flow of cooling medium from the engine through said thermostatic means and back to the engine, conduits connecting said thermostatic means with said heater and said radiator, and means controlled by said thermostatic means for initially closing said conduits to said heater and to said radiator while continuing a flow through said by-pass with the cooling medium at relatively lower temperatures and for first gradually opening thereafter the conduit to said heater as the engine gradually warms up the cooling medium, for subsequently gradually opening the conduit to the radiator, and for finally gradually closing said by-pass means while fully opening the conduits to said heater and radiator as the temperature of said cooling medium increases.

4. In a cooling system for an internal combustion engine driven vehicle having a liquid cooling medium therein, a vehicle heater, a radiator, thermostatic means connected to said engine for passage of the cooling medium therethrough, a tubular valve controlled by said thermostatic means, a by-pass means for conducting the flow of cooling medium from the engine through said thermostatic means and through said tubular valve and back to the engine with the cooling medium at relatively lower temperatures, separate conduits connecting said thermostatic means with said heater and said radiator, said conduits being physically spaced apart relative to each other, said valve including means for shutting off the conduits to said heater and to said radiator with the cooling medium at said relatively lower temperatures, for gradually opening at first the conduit to said heater as the engine gradually warms up the cooling medium, for gradually opening thereafter the conduit to said radiator as the heater conduit is partly opened, for subsequently gradually closing said by-pass as the heater conduit is fully opened and the radiator conduit partly open, and finally closing the by-pass entirely as both the heater and radiator conduits are fully open.

References Cited in the file of this patent

UNITED STATES PATENTS

| | | |
|---|---|---|
| 1,328,855 | Sweet | Jan. 27, 1920 |
| 2,038,193 | Parsons | Apr. 21, 1936 |
| 2,071,659 | Rose | Feb. 23, 1937 |